United States Patent [19]
Pohjonen et al.

[11] Patent Number: 5,380,139
[45] Date of Patent: Jan. 10, 1995

[54] LOAD HANDLING METHOD AND SYSTEM

[75] Inventors: Jukka Pohjonen, Helsinki; Pekka Heikkila; Jouko Tolonen, both of Vantaa, all of Finland

[73] Assignee: Kone Oy, Helsinki, Finland

[21] Appl. No.: 910,880

[22] Filed: Jul. 10, 1992

Related U.S. Application Data

[63] Continuation-in-part of Ser. No. 630,806, Dec. 24, 1990, Pat. No. 5,129,777, which is a continuation of Ser. No. 298,198, Jan. 17, 1989, abandoned, which is a continuation of Ser. No. 68,088, Jun. 30, 1987, abandoned.

[30] Foreign Application Priority Data

Jun. 30, 1986 [FI] Finland .................................. 862777

[51] Int. Cl.6 .............................................. B65G 1/04
[52] U.S. Cl. ........................................ 414/280; 901/47; 364/478; 414/661; 414/273; 414/751; 414/752; 414/278; 414/282
[58] Field of Search ............... 414/752, 626, 282, 278, 414/627, 661, 751, 786, 280, 281, 277, 267, 273, 266, 225; 901/47; 364/478

[56] References Cited

U.S. PATENT DOCUMENTS

| | | |
|---|---|---|
| 3,101,852 | 8/1963 | Pearne . |
| 3,630,319 | 12/1971 | Peterson et al. . |
| 3,674,159 | 7/1972 | Lemelson . |
| 3,750,804 | 8/1973 | Lemelson . |
| 3,762,531 | 10/1973 | Lee . |
| 3,782,565 | 1/1974 | Doran et al. . |
| 3,805,973 | 4/1974 | Thompson . |
| 3,820,667 | 6/1974 | Critchlow et al. . |
| 4,492,504 | 1/1985 | Hainsworth . |
| 4,509,893 | 4/1985 | Nashimoto et al. . |
| 4,678,390 | 7/1987 | Bonneton et al. . |
| 4,789,295 | 12/1988 | Boucher, Jr. et al. . |
| 5,139,384 | 8/1992 | Tuttobene ................. 414/280 X |

FOREIGN PATENT DOCUMENTS

| | | |
|---|---|---|
| 116126 | 8/1984 | European Pat. Off. . |
| 2600714 | 7/1976 | Germany . |
| 3539115 | 5/1987 | Germany . |
| 41976 | 11/1974 | Japan . |
| 534624 | 3/1973 | Switzerland . |

Primary Examiner—Frank E. Werner
Attorney, Agent, or Firm—Sughrue, Mion, Zinn, Macpeak & Seas

[57] ABSTRACT

A method of and system for handing variable sized loads by transferring the loads between a storage base and a transport base by engaging a portion of at least one engagement member, e.g. a suction cup, with an engagement surface on a side or end of a load, and displacing the engagement member to thereby pull a load onto the transport base for transport by the transport base or to push a load from the transport base onto the storage base. The engagement surface has a size at least equal to that of the portion of the engagement member. The system includes a system for determining load position and size.

10 Claims, 7 Drawing Sheets

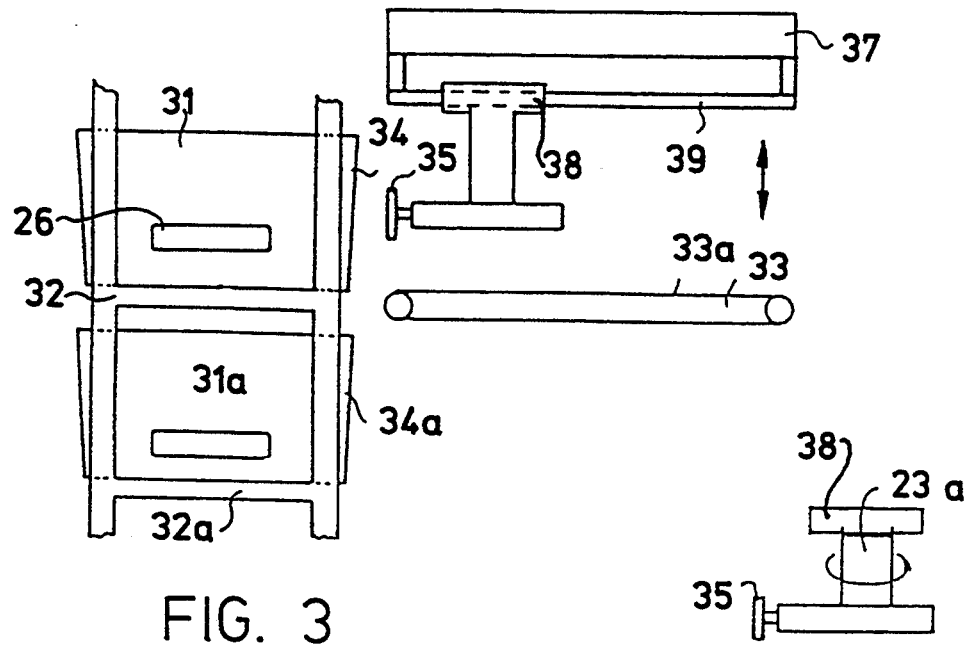
FIG. 3
FIG. 5
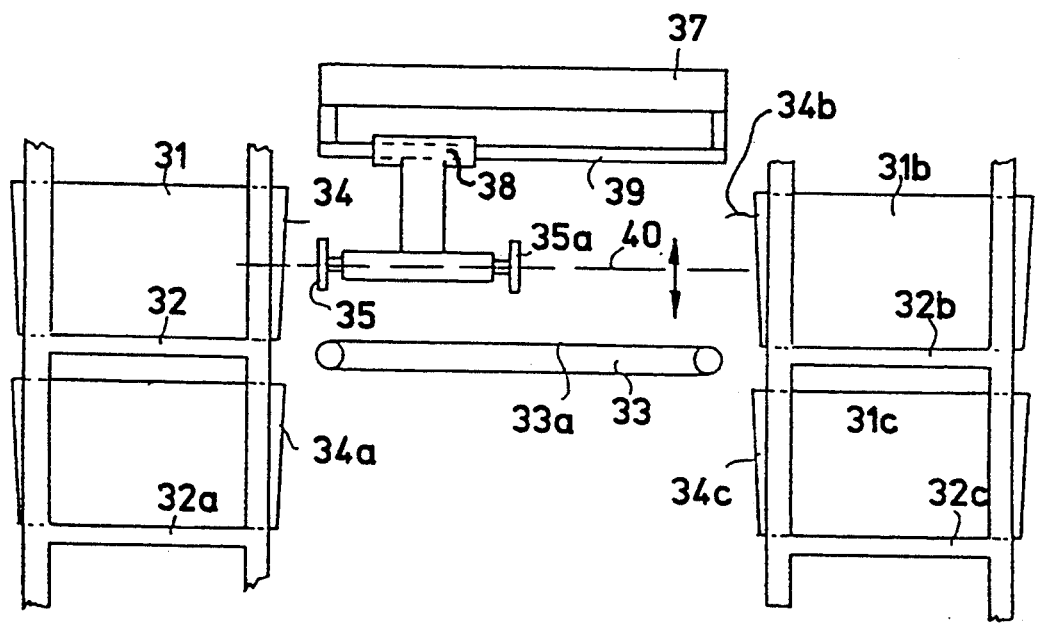
FIG. 4

LOAD HANDLING METHOD AND SYSTEM

RELATED APPLICATIONS

This application is a continuation-in-part of application Ser. No. 630,806 (Allowed) filed Dec. 24, 1990, now U.S. Pat. No. 5,129,777 which is a continuation of application Ser. No. 298,198 (Abandoned) filed Jan. 17, 1989, which is continuation of application Ser. No. 068,088 (Abandoned) filed Jun. 30, 1987.

FIELD OF THE INVENTION

The present invention relates to a method of and apparatus for handling loads, by which a load may for example be moved from a storage base, on which the load is kept in storage, onto a transport base on which the load is moved about, or from a transport base onto a storage base.

BACKGROUND OF THE INVENTION

Motor as used herein refers non-exclusively to electric, hydraulic and pneumatic motors and the like, and their associated hardware, including conventionally known control hardware, as employed in known manner in the appropriate art, and can be employed in the alternative.

Cylinder as used herein refers non-exclusively to pneumatic and hydraulic actuating cylinders and the like, and their associated hardware, including conventionally known control hardware, as employed in a known manner in the appropriate art, and can be employed in the alternative. Further, this term is also applied to other mechanical means of linear displacement such as rack and pinion systems, linear motors and the like, and others systems conventionally known in the art for effecting controlled linear displacement, and can be used in the alternative.

Conveyor as used herein refers non-exclusively to belt-type conveyor systems, driven-roller conveyor systems and chain-type conveyor systems, and others systems commonly used in place of the above, and their associated hardware, as employed in a known manner in the appropriate art, and can be employed in the alternative.

Present practice in load handling in warehouses with shelves for example, is to use load handling equipment by which the load is moved onto a shelf or other storage base, or taken away therefrom, by means of telescopic forks which are pushed beneath the load or by belt or chain conveyors which are inserted beneath the load. Forks or conveyors entering under the load have the disadvantage that the shelves have to be made unnecessarily high because empty spaces must be left between the shelves and the load to allow for the load handling. Another drawback is slow operation owing to unnecessary motions, because the fork or conveyor must enter beneath the load prior to any load handling operation and, finally, the fork or conveyor has to be withdrawn from beneath the load.

Also at the present time, equipment is used in load handling which grips a rib or equivalent means provided on an end face or a side of the load. Unnecessary motions are thereby avoided, since the load handling equipment need not enter beneath the load. There is, however, the drawback that the manufacture of, for example, crates or containers employed for this purpose is inconvenient owing to the provision of the ribs or equivalent means on the exterior of the crates or containers. Moreover, the protruding ribs or equivalent means are an impediment to the stacking of the crates or containers upon each other when empty.

European Patent 0 116,126 discloses an electromagnetic gripping system that is deployed from a standby position located below the conveyor system. This system has a disadvantage in that the height of the gripping means above the conveyor system is limited and non-adjustable. A further disadvantage is that any small parts that may fall from a container being handled by the system has a chance of falling into the working mechanism of the device thereby causing damage and down-time. U.S. Pat. No. 3,750,804 teaches a load handling mechanism designed for use in gravity feed storage systems and employs a unidirectional overhead gripping means requiring rotation of the entire mounting means in order to address both sides of a corridor. In addition, the overhead mounting system limits by its design the width of load that can be handled by the conveyor system.

BRIEF SUMMARY OF THE INVENTION

It is accordingly an object of the present invention to address the above-discussed disadvantages of the prior art.

Accordingly, the system for handling a load comprises a storage base for storing a load, said storage base comprising a plurality of spaced apart opposed storage shelves; a transport base and an engagement unit vertically disposed in adjustable relationship to each other, and mounted on an elevating means, said elevating means being vertically and laterally displaceable to a predetermined position opposite a predetermined storage shelf of said storage base; slide rail means depending from said engagement unit; an engagement member depending from said slide rail means, said engagement member adapted to be axially displaceable along the length of said slide rail in a direction towards and away from said predetermined storage shelf; at least one engagement means disposed on said engagement member, said engagement means engageable with an engagement surface on said predetermined load for moving said load between said storage and transport bases and said transport and storage bases; and position detecting means disposed on said transport base for detecting the position of a predetermined load with respect to said transport base and said engagement unit.

According to the present invention, a method of handling a load comprises the steps of transferring a load between a storage base and a transport base by engaging a portion of at least one engagement member with an engagement surface on a side or end of the load, and displacing the engagement member to thereby pull the load onto the transport base for transport by the transport base or to push the load from the transport base onto the storage base, the engagement surface having a size at least equal to that of the portion of the engagement member.

Thus, no projections interfering, for instance, with the stacking of empty crates or containers are needed on the load, and the load handling is fast because unnecessary motions are avoided, the handling taking place by action directed on the side or end of the load, not under the load.

The method may include employing a suction cup as the engagement member. When a suction cup is used, it is possible to use, standard storage containers for the load, since it is possible to use the ends or sides of such containers, as the engagement surfaces.

Preferably, the method includes displacing the suction cup into contact with the engagement surface, creating vacuum in the suction cup to secure the suction cup in engagement with the engagement surface, pulling the load by means of the suction cup from the storage base onto the transport base, releasing the vacuum from the suction cup, and displacing the suction cup out of contact with the engagement surface.

The suction cup can also be displaced into contact with the engagement surface and used to push the load means onto the storage base, after which the vacuum is released from the suction cup which is then displaced out of contact with the engagement surface.

Alternatively, an electromagnet may be employed as the engagement member, the engagement surface being magnetic. An electromagnet is well suited for example to transport metal crates and containers, and moreover, electromagnets have the advantage of being relatively simple in construction. Use of electromagnets however have an inherent limitation in the nature of residual magnetism, and may be detrimental if employed in the handling of magnetically sensitive materials such as micro-chips, computer parts, magnetic storage media, etc.

The load can be pulled from the storage base onto the transport base by the electromagnet by displacing the electromagnet into contact with the magnetic engagement surface, energizing the electromagnet, whereby the electromagnet is secured to the engagement surface, pulling the load by means of the electromagnet from the storage base onto the transport base, de-energizing the electromagnet, and displacing the electromagnet out of contact with the engagement surface.

The load can also be pushed from the transport base onto the storage base by the electromagnet by directing the electromagnet into contact with the engagement surface, energizing the electromagnet, pushing the load by means of the electromagnet onto the storage base, de-energizing the electromagnet, and disengaging the electromagnet from contact with the engagement surface.

A conveyor may be employed as the transport base, the load being displaced relative to the conveyor by means of the conveyor. When using a conveyor as the transport base, space savings are obtained because use of the conveyor makes it possible to transport the load on the transport base to its ultimate location with the engagement member being needed only at the initial phase of load movement.

Located on the transport base is a load position detecting array which provides information to the system controller. From this data, the position of the engagement member is controlled relative to the position of the load. In an alternate embodiment the position array also provides information as to the height of the load on the conveyor.

The travelling base and transport base also comprise location determination means for determination of their position relative to the storage base. This information is stored in a non-volatile or flash RAM so be available immediately upon startup.

The transport base may be positioned higher than the storage base during movement of the load from the storage base onto the transport base or from the transport base onto the storage base, a combined pulling and lifting motion being employed during movement of the load from the storage base onto the transport base. The load handling will thus not be affected by inaccurate positioning because the transport base may be left either at the same level as the storage base or at a higher level.

According to another aspect of the invention, there is provided a load handing system comprising a transport base for moving the load, an engagement unit for engaging the load, and rail means supporting the engagement unit for sliding movement, the engagement unit comprising at least one engagement member having a portion engageable with an engagement surface on a side or end of the load for pulling the load from the storage base onto the transport base or for pushing the load from the transport base onto the storage base, and the engagement surface having a size at least equal to the size of the portion of the engagement member.

The system can comprise at least two engagement means which can be electromagnets or in a preferred embodiment, suction cups.

In a preferred embodiment, the engagement unit comprises a pair of engagement members located at opposite ends of the engagement unit on an axis parallel to the direction of travel of the engagement unit on the rail means. It is thereby simple to manage loads on opposite sides of a warehouse lane.

The engagement member is preferably self-aligning relative to the engagement surface to compensate for slight misalignments.

The transport base preferably comprises moveable conveyor means for displacing the load thereon.

BRIEF DESCRIPTION OF THE DRAWINGS

Further objects, features and advantages of the invention will be apparent to those skilled in the art from the following description thereof when taken in conjunction with the accompanying drawings, in which:

FIG. 3 shows a view in elevation of a load management means according to the invention and a storage shelf, with containers, in elevational view;

FIG. 4 shows a load management means according to the invention serving storage shelves on both sides of a warehouse lane;

FIG. 5 shows a view in elevation of a rotatable slide with suction cups;

DESCRIPTION OF THE PREFERRED EMBODIMENT

The operation of the load management apparatus of the invention shall firstly be discussed with reference to FIGS. 1, 2, 2a, 2b, and 2c.

Figure 1:
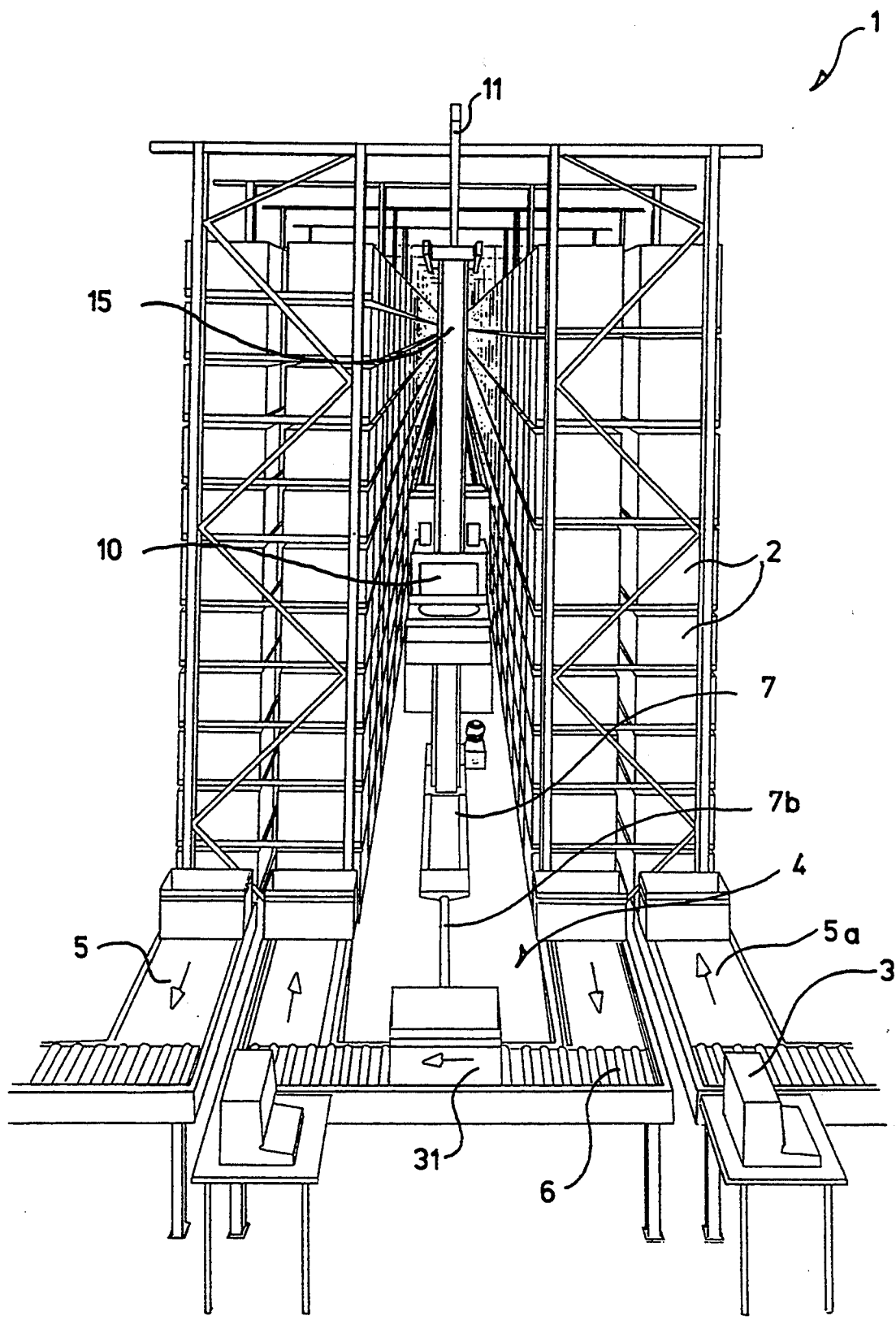
FIG. 1 shows a perspective view of a load management system according to the invention, disposed in a storage shelf corridor.

FIG. 1 depicts a typical warehouse shelving system wherein the instant invention finds utility. A double-sided singular shelving unit 1 can extend upwards to a height of approximately 11 meters and one corridor can contain as many as 6000 shelf compartments. As will be noted from the drawing, the height of individual shelves 2 can vary within a singular shelf unit. While shelves of uniform height can be grouped together as shown in the drawing, they can alternatively occur regionally as required by the desiderata. The system has provided at least one control terminal 3 in association with the system. A separate control terminal 3 can be installed at each corridor 4, and located in close association with the corridor as shown, or alternatively, be a remote terminal interactively coupled in known manner. Each corridor 4 is provided with a buffer regions 5 and 5a, at either or both ends, each of which may provide sufficient space for at least five containers, depending upon space constraints within the warehouse. The buffer regions provide temporary storage for material coming from (5) and going to (5a) the storage shelves. Each buffer region 5 and 5a is associated with a conveyor system 6 which may comprise roller or chain type conveyors and which can be disposed at either or both ends of the shelving unit. While not depicted in the drawings, the corridors may be sunken so as to allow full use of the lowest level of shelving.

Referring now to FIGS. 2 and 2a to 2c, there is shown in side elevation, a load management system according to the invention. The load management system comprises four distinct subsystems, these being the travelling base system 7 and associated parts, the hoisting system 8 and associated parts, the transport base 9 and associated parts, and the travelling control system 10.

Turning firstly to the travelling system, there is shown the travelling base 7 which includes means to move the travelling base 7 along a set of travel rails 7b to predetermined locations within the corridor 4. Movement may be effected by motor or cylinder systems 7a as desired. This portion of the overall system is generally known to those skilled in the art. Additionally, the base 7 provides support for the travelling control system 10 which will be discussed in greater detail at a later point.

Figure 2:
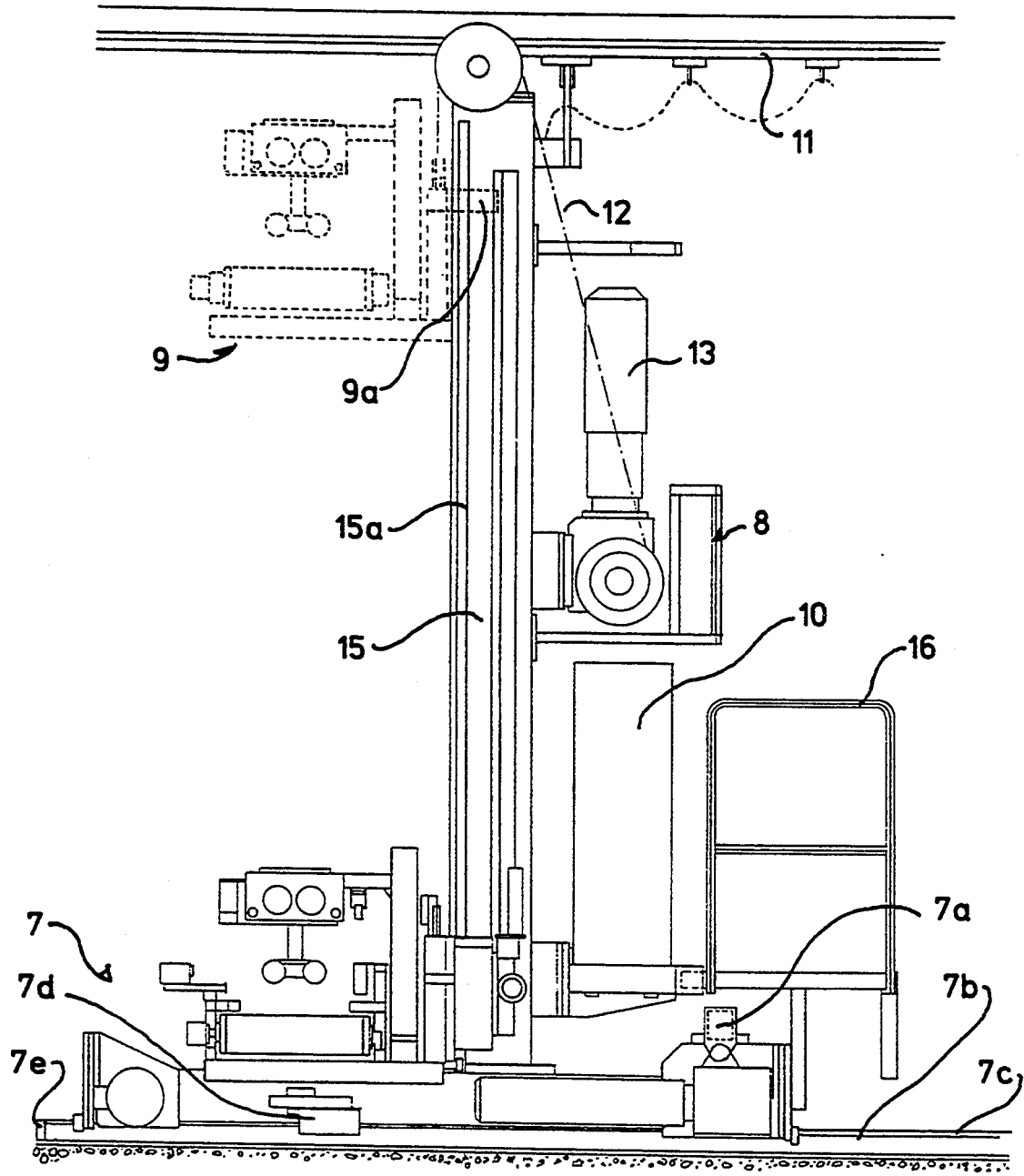
FIG. 2 is a side elevational view of a load management means according to one embodiment of the invention.
Figure 2A:
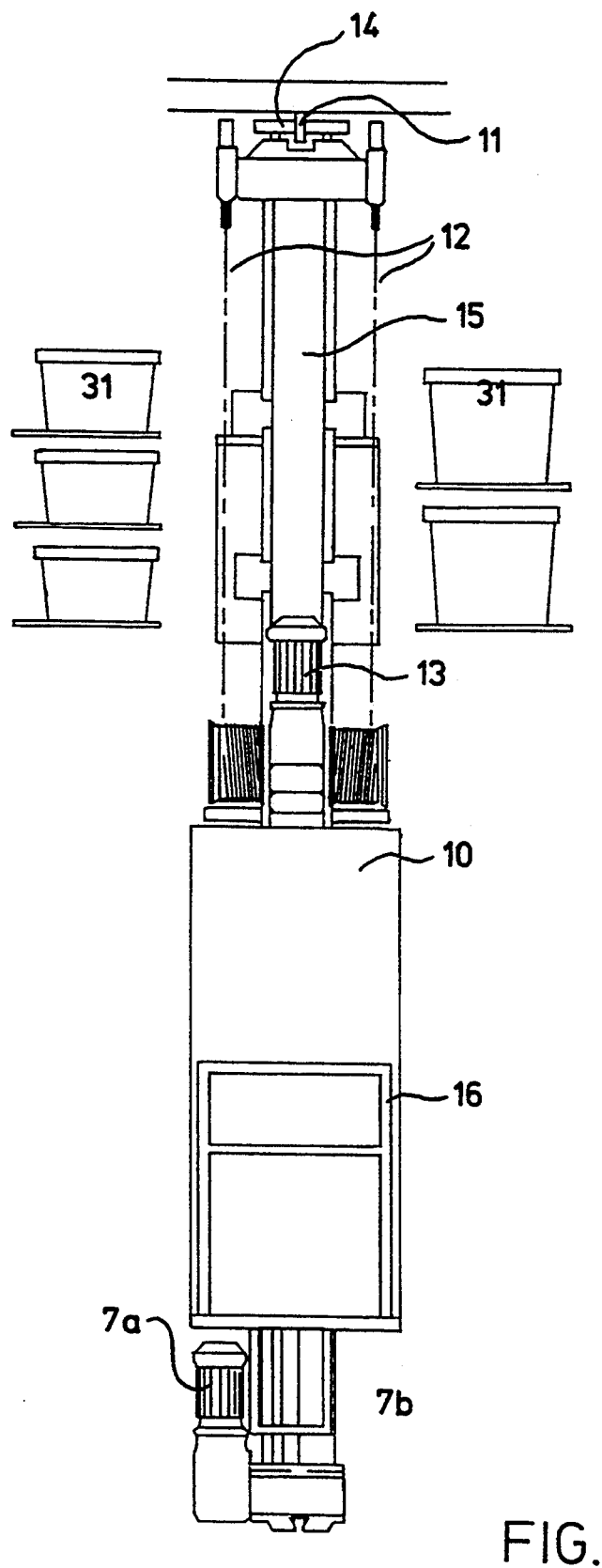
FIG. 2a is an end elevational view of the hoist end of FIG. 2.

FIGS. 2 and 2a show that the hoisting system 8, is upwardly dependent from the travelling system and provides support for, and allows for, vertical displacement of the transport base 9 which laterally depends from it. The tower 15 is secured and guided at the top by means of an overhead guide rail 11 which also provides convenient means to provide power, such as electricity and hydraulic or pneumatic pressure, for the travelling base 7, control system 10, and hoisting machinery 8. The raising and lowering of the transport base 9 to predetermined vertical points is effected by means of a hoist cable 12 depending from the hoist machinery 8 and driven by motor 13. The tower 15 is vertically stabilized by rollers 14 operating on both sides of the overhead rail 11. A platform and railing 16 may be provided for the safety and convenience of personnel required for servicing.

The system further comprises location sensors for both horizontal and vertical movements. Preferably located on the travel rail 7b is a gear rack 7c for engaging a gear which forms part of a pulse sensing system 7d which is disposed at an appropriate position on the travelling base 7. Horizontal displacement of the travelling base 7 is accordingly determined. Disposed on the tower 15 is a gear rack 15a for engaging a gear which forms part of a pulse sensing system 9a located in the transport base 9. Pulse sensing system 9a interacts with the gear rack 15a as the transport base is vertically displaced. An optical, mechanical, magnetic, or electric sensor in the pulse sensing systems operatively interacts with the rotating gear, so as to detect the extent of gear rotation. The pulse sensing system for each gear can further comprise multiple detectors for greater resolution of gear movement. This information is issued to the system controller which then determines the displacement of the unit from its previous known location.

By means of the pulse sensing system, the absolute horizontal and vertical location of each travelling base and associated tower and transport base (together being termed an SR-unit) is determined to within at least one pulse resolution or better. Accordingly, the whole system knows the location of each SR-unit.

In the event of a power disruption or unauthorized usage, the data pertaining to the locations of the SR-units may disappear. To overcome these types of occurrences, the system is equipped with an internal program that automatically performs a location run (a reference run) when the system is switched on. In order to facilitate the reference run, there is one location at each end of each corridor where there are additional sensors 7e which can be magnetic, electric, mechanical, or optical in nature. During initialization, the transport base is dropped to its lowest location on the tower, and the travelling base moves to one end or the other where a sensor is triggered. By triggering one of the sensors 7e, the SR-unit location is determined. The horizontal position is then known by means of the sensor, and the vertical position known by its start value. An internal program is then set to a predetermined value which represents exactly the coordinates of that location in the system. From that point onward, the counting of pulses continues each time the SR-unit moves (either vertically -transport base- or horizontally -travelling base- or both at the same time). In another embodiment, the current position of the SR-unit is continuously updated in non-volatile memory locations and is immediately available upon startup should a power failure occur. This embodiment, of course, obviates the need for an initial location run, and the corresponding software.

The location of each shelving unit, container and buffer region is indexed in a system reference table. For instance, one location could be: x10, y15, z1. That means the tenth location in the horizontal direction, the 15th location in the vertical direction and the right side of the corridor. (x0, y0, z2 could for instance represent the first buffer region located on the left side of the corridor i.e. material to be stored). Certain pulse values correspond to actual distances in the horizontal and vertical direction. The correspondence between actual distances and pulse values must be predetermined on a case by case situation during installation of the system as the dimensions of the containers, corridors, and shelves may vary, as may the locations and sizes of the end buffer regions.

The system computer forwards the operation command to the system, the command including a desired location and operation to be performed at the location. The desired operation command would include at least one of the following functions: TAKE, LEAVE, NO OPERATIONS.

When the information of a desired location is provided by the system computer, the SR-unit compares the pulse values and locates itself. It then relocates to the desired location and performs the encoded command.

Figure 2B:
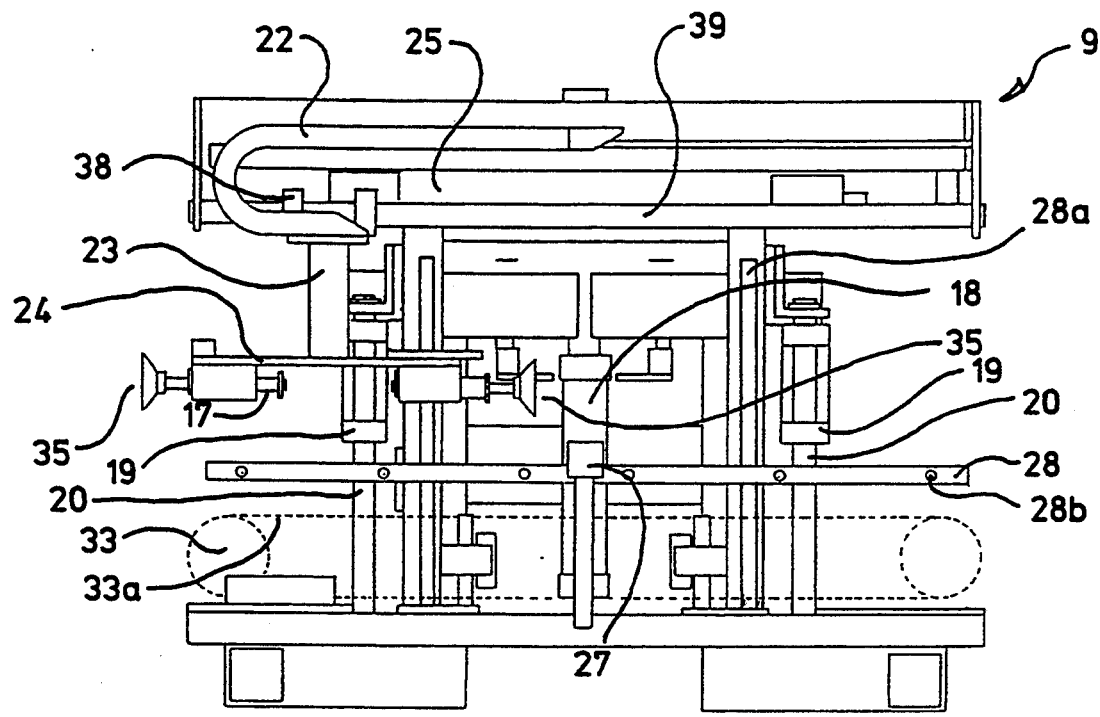
FIG. 2b is an elevational view of the transport base of the instant invention.
Figure 2C:
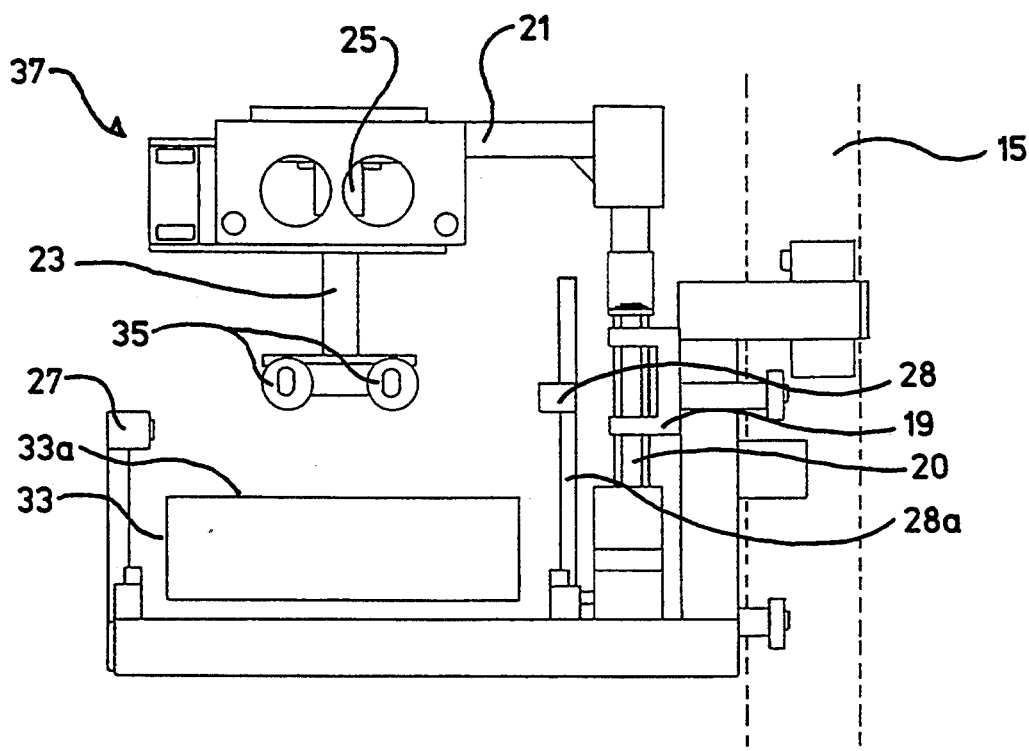
FIG. 2c is a sectional view of FIG. 2b.

As shown in FIGS. 2b and 2c, the transport base 9 comprises a bi-directional conveyor 33, and overhead engagement unit 37. In order to adjust the height of the overhead engagement unit 37 relative to the conveyor 33, cylinder 18, working in cooperation with outboard stabilisers 19 disposed on stabiliser members 20 is provided. By means of cylinder 18, the system control 10 can dispose the engagement unit 37, and thereby the engagement means 35, at a height just above the conveyor 33 for engaging containers 31 having a low height, to the maximum designed vertical extension to allow optimum engagement positioning for tall containers. This advantage allows the apparatus to extremely flexible in the sizes of containers that may be handled. In addition, the ability to locate the engagement means at an optimum height for each container, substantially reduces the amount of wear and tear introduced by flex-induced stress of the engagement face, and permits lighter materials to serve as container walls. Additionally, several different container sizes may be made standard in a single environment permitting more efficient storage of materials.

Overhead support member 21 extends laterally and supports other elements of the overhead engagement unit 37 vertically over the conveyor 33. Rails 39 depending horizontally from support member 21 and can be of various cross-sections such as square, circular oval, etc., and provides a running track for slider 38. Flexible conduit 22 for control lines, data lines, and power is provides connection to slider 38 from the overhead support member. Slider 38 is enabled for movement by air, hydraulic cylinder, electric or hydraulic motor 25. Depending vertically from slider 38 is vertical support 23, which may be enabled for rotational movement. Depending horizontally from vertical support 23 is horizontal support member 24 from which depends on either or both ends, engagement means 35. Engagement means 35, by means of spring units 17 (indicated generally) are independently extensible, and in FIG. 2b, the left-hand engagement means is shown in the contacted position, as it would be after contact with a container 31, while the right-hand engagement means is shown in the normal extended position. At such time as the suction cup makes firm contact with a load, a limit switch (not shown), indicating the end position of slider 38 signals the controller which in turn stops the forward movement of slider 38 and enables a vacuum line so as to produce a vacuum at the suction cup. The actual materials employed and position chosen to effect the limit switch, will depend upon the desiderata of each installation for criteria such as total deflection, sensitivity, etc. and are within the scope of those skilled in the appropriate art.

The identity of a container is determined by means of bar-code identifiers 26 (although not shown in this figure bar codes identifiers are typical to all figures) disposed on one side wall of the container and bar-code reader 27 disposed at the centre of the conveyor 33. The bar code provides "contents" data and may or may not provide physical dimensions of the load for the system controller. The position of the container on conveyor 33 is determined by position detector array 28 disposed somewhat above and to either side of the conveyor. The array 28 comprises a minimum of 4 optical detectors 28b located at precise predetermined locations, and can comprise several more for greater accuracy, as in installations where there are several different container lengths being employed. The detectors can be of the detector/emitter pair type. Additionally, the detector array may extend vertically by means of rails 28a so as to provide information as to the height of a container. In a preferred embodiment, detection of the container can be effected by beam-make means wherein a reflection from the side of a container is necessary to generate a position signal for a detector/emitter pair. In an alternate embodiment, a series of infra-red detector/emitter pairs on one side communicate by means of reflectors disposed on the other side of the conveyor. In yet another embodiment, the position array comprises on one side of the conveyor, a series of light sources and, on the otherside, a complimentary series of photodetectors, both former and latter embodiments employing the beam-break principle. Tuning of detector/emitter pair signals can be effected by means of appropriate lenses, or alternatively E/D pairs can be tuned to communicate exclusively by means of individual predetermined transmit/receive frequency filters thereby preventing crosstalk between detector groups even when at close proximity to each other. The position detector array 28 provides a method of accurately determining the position of a container on the conveyor and ensuring that an edge of the container is not protruding into the corridor prior to movement of the transport base. An imaginary vertical line, located between the centre most detectors is a reference coordinate, generally referred to as the neutral axis 29, and is the general "Wait for job" position.

The detector array provides data to the system controller 10. From the position of the load on the conveyor, the controller then instructs the engagement unit 37 as to when to leave the neutral axis for a position to the left or right thereof, drop down to service height and engage a load, either to effect the drawing of the load onto the conveyor, or to place the load on a storage shelf. During the stage of drawing the load onto the conveyor, the detector array provides information as to the position of the load, i.e. as to when the leading or trailing edge of the load reaches a predetermined position on the conveyor as determined by the array output data, a signal is generated by the controller instructing the engagement unit to retract from service height, that is, return to a high neutral position.

In an alternative embodiment, the position detector array 28 is enabled, by means of cylinders (not shown), for vertical displacement along rails 28a thereby permitting determination of the height and position of the load 31 as the load is drawn on the conveyor 33. The controller system memory has previously entered data concerning the height of the load and this information is compared to the real time reading from position array 28. By means of this comparison, should incorrect data about the height of a container be entered into the memory, problems will not occur as the system can respond to the real-time reading from the position array to establish a high neutral position for the instant load. In this embodiment, the vertical position of the detector array starts at a marker position with respect to the conveyor prior to a load being brought onto the conveyor from the loading buffer region. As the load is drawn onto the conveyor, the distance between the detector array and conveyor increases until the array generates a controlling "top of load" signal for the system controller, and then the height of the detector array decreases until the load is again "in view" so as to provide a reading regarding the length of the load. This signal provides information about the height and length of a new incoming load to be stored thereby allowing a greater degree of packaging flexibility while reducing the manpower required to take the measurements. This permits the system controller to compare the incoming height to available shelves and determine an appropriate shelf, taking into consideration the "contents" label of the load. This increases the flexibility of variable-container-size automated storage systems without requiring additional operator input.

In FIG. 3 there is depicted, in elevational view, a load management apparatus which is in the process of moving a container 31 from a storage shelf onto a conveyor 33, by means of which the container 31 can be transported to any desired location in a storage area. As taught by the invention, the container 31 is pulled off the shelf 32 onto the belt 33a of the conveyor by means of at least one engagement means 35, in this case a suction cup, which by means of vertical support 23 is mounted on a slide 38 provided on the engagement unit 37. The slide 38 is adapted for movement on rails 39 and can be enabled for movement by means of either cylinders or motor 25 (FIG. 2b, 2c). The transport base, comprising a conveyor and an overhead engagement unit are mounted on a tower 15 (FIG. 2) and enabled for vertical movement, by which they can be moved about and directed, both vertically and horizontally, in a manner known in the prior art, to come into register with the container 31. Such register, for reasons discussed later, can be above the height of the shelf floor. Thereafter, the suction cup 35 is displaced, with the aid of the slide 38, to contact the container 31, by the aid of which the suction cup 35 engages an end face 34 of the container 31 by means of a vacuum, the end face 34 serving as the engagement surface.

Next, the container 31 is pulled off the shelf 32 onto the conveyor 33. With a view to space economy, the container 31 is not pulled by the suction cup 35 all the way into position in the centre of the conveyor. Instead, the displacement of the load to the centre of the conveyor 33 is accomplished with the aid of the conveyor belt 33a and motor driving the belt 33a. Prior to operating the conveyor 33, the vacuum of the suction cup 35 has to be released and the suction cup moved out of the way of the container 31. Since the suction cup 35 is not used other than in the initial phase, savings can be made by reducing the width of the warehouse lane because the required width is then only the length of the conveyor 33, not the combined lengths of conveyor 33 and the slide 38.

When displacing the container 31 from the conveyor 33 onto the shelf 32, the suction cup 35 is firstly displaced into contact with the container 31 and a vacuum is then created in the suction cup. The load is thereafter pushed onto the shelf 32. In order to reduce the warehouse lane width required, and since the conveyor is at height above that of the shelf, the movement of the container 31 is commenced with the aid of the conveyor 33, whereafter the container 31 is pushed into the final position using the suction cup 35. The vacuum is thereafter released and the suction cup 35/engagement member is returned to a neutral position.

Displacement of another container 31a to and from the shelf 32a is accomplished in a similar manner by firstly moving the engagement unit 37 with its slide 38 down to the service height for container 31a and by then making use of the end face 34a as an engagement surface.

When a suction cup 35 is used to move the load, the load may be for instance a common plastic or cardboard container. It is possible, with modern suction cups, to achieve high degrees of vacuum and therefore load engagement surfaces need not be perfectly smooth or even. There must merely be an accessible engagement surface the size of the suction cup is so that vacuum pressure will be maintained without rapid leakage. Instead of a single suction cup, several suction cups may be used when handling large loads.

If the suction cup is one that aligns itself with the load, the engagement surfaces need not themselves be perfectly aligned for engagement. A self-aligning suction cup may, for instance, be constructed with a pivot in the arm of the suction cup. In that case, the suction cup will align itself properly with the engagement surface so that the vacuum required for engagement of the load can be obtained.

It is often advantageous when moving a container 31 onto the conveyor 33 and onto the shelve 32, or vice versa, to position the conveyor 33 to be slightly higher than shelve 32, making the container 31 thereby easier to move. In this case, as the container 31 is being pulled from the shelf 32, it is at the same time lifted with the aid of the suction cup 35 so as not to foul the edge of the conveyor 33. It is also possible, in certain instances, to use another container or crate as a storage base and the placing of the container or crate upon another is then facilitated if the transport base is positioned somewhat higher than the container or crate serving as the storage base.

In FIG. 4 there is depicted, in elevational view, a load handling apparatus according to the invention which enables loads at both sides of the warehouse lane to be handled by a single apparatus. Displacement of the containers 31-31c shown in FIG. 4 is accomplished by providing, on the slide 38 moving on rails 39 of the engagement unit 37, an even number of suction cups 35 and 35a. These suction cups are located at opposite ends on axis 40 parallel to the direction of travel of the slide 38. Thus, suction cup 35 can be employed to move containers 31 and 31a on one side of the lane onto the conveyor 33 from shelves 32 and 32a, or vice versa, the other suction cup 35a can be employed to move containers 31b and 31c on the other side of the lane onto the conveyor 33 from shelves 32b and 32c, and vice versa, making use of the engagement surfaces 34b and 34c.

In FIG. 5 there is shown yet another embodiment by which load handling is likewise accomplished on both sides of the lane. In FIG. 5 there is depicted a slide 38 from which depends rotatable vertical support 23a with suction cup 35. The vertical support 23a can rotate in the horizontal plane, for instance with the aid of a motor (not shown) and pivot or bearing, so that the suction cup 35 is engageable with loads on opposite sides of the lane. The remaining operating features are similar to those discussed in FIGS. 3 and 4.

Figure 6A:
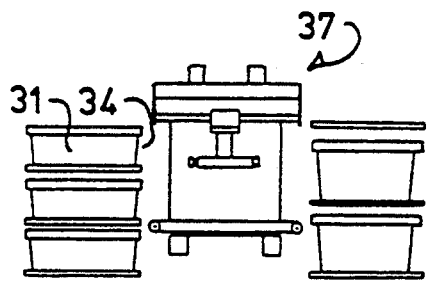
FIGS. 6a to 6j show a method of load handling according to the invention.
Figure 6B:
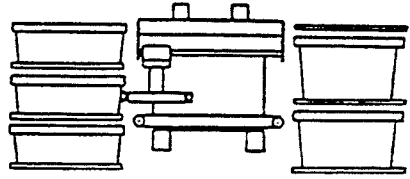
Figure 6C:
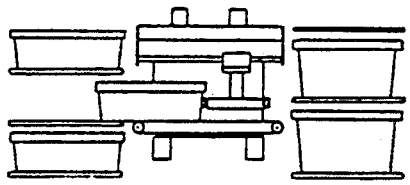
Figure 6D:
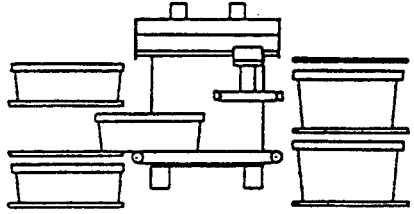
Figure 6E:
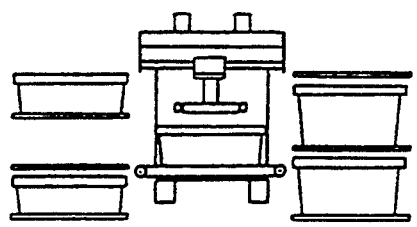

FIGS. 6a to 6j depict a typical retrieve and store operation. In FIG. 6a, the engagement unit 37 is shown in the high neutral position (neutral vertical axis 29) as the transport base 9 aligns itself with a predetermined shelf. The engagement unit 37 then proceeds to drop to service height and the suction cups 35 of the engagement unit 37 are displaced into contact with the engagement face 34 of container 31, as shown in FIG. 6b, and vacuum to the suction cups 35 is engaged. The conveyor and engagement unit work cooperatively to withdraw the load. While the container is being partially withdrawn, the identity of the container is confirmed by means of bar-code identifier 26 disposed on a side face of the container and bar-code reader 27 disposed centrally on the conveyor unit. FIG. 6c shows the engagement unit 37 having partially withdrawn a container 31 and the engagement face 34 entering the neutral axis 29. Position detectors 28 (not shown in these drawings) inform the control circuit that the container has entered the neutral axis, vacuum to the cups 35 is disengaged and the engagement unit 37 is withdrawn to the high side position as shown in FIG. 6d. The conveyor 33 is engaged and the container 31 is drawn to the centre of the conveyor, and simultaneously, the engagement member is repositioned in the high neutral position as shown in FIG. 6e prior to the moving of the transport unit. The position of the container is determined as being entirely on the conveyor and approximately centre of the conveyor by means of position detectors 28. Should a problem occur in jamming and the load not be correctly positioned, the system can use a series of preprogrammed maneuvers to attempt to correctly place the load. If this is not possible, an operator is summoned. The system readout is available to the operator who has local control by means of hand controls at the travelling controller 10.

Figure 6F:
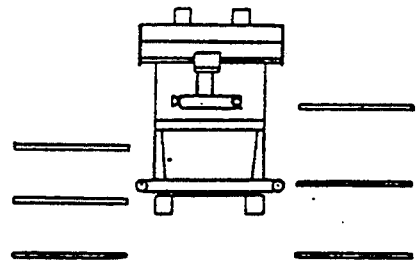
Figure 6G:
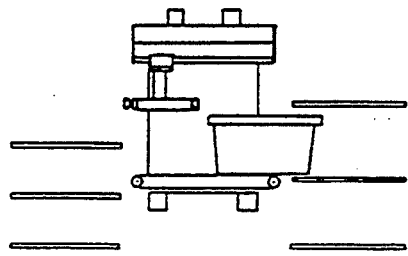
Figure 6H:
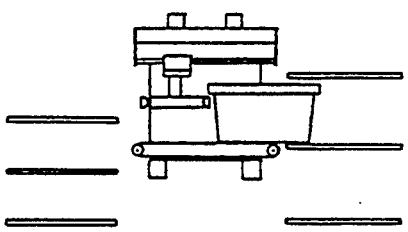
Figure 6I:
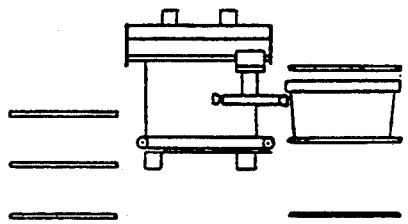
Figure 6J:
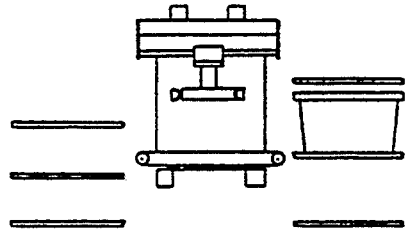

FIG. 6f shows the transport base coming into registration with a predetermined shelving unit with a load to be stored. Shown in FIG. 6g, the conveyor is activated and the load is displaced until the load engagement face 34 is within the neutral axis 29 as determined by position detectors 28, and simultaneously, the engagement unit 37 is displaced to the high side position. At this point, as shown in FIG. 6h, the engagement unit drops to service height, the suction cups 35 engage the load face 34, and vacuum is applied. The engagement member in cooperation with the conveyor then pushes the load from the conveyor entirely onto the shelving unit as depicted in FIG. 6i. Once the load is on the shelf, the engagement member is returned to the high neutral position, shown in FIG. 6j, to await the next instruction.

Figure 7A:
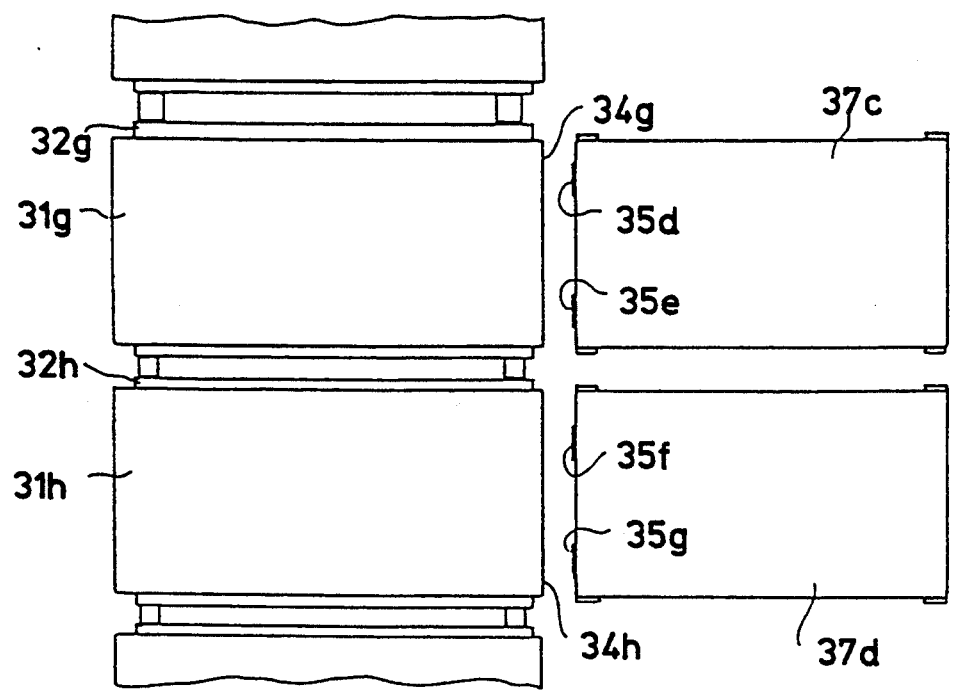
FIG. 7a shows a plan view of two load management un according to the invention and a storage shelf with containers.
Figure 7B:
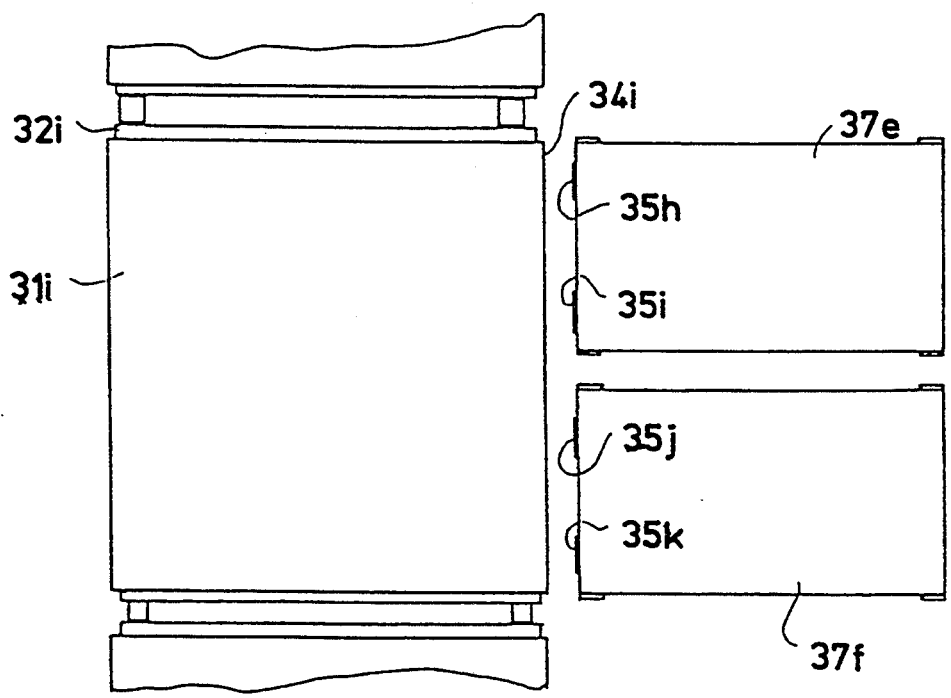
FIG. 7b a plan view of two load management units according to the invention, built for moving a single container, in top view.

While the engagement unit 37 is withdrawing or pushing a load, the conveyor 33 and the engagement member work cooperatively at a fixed speed i.e. equal conveyor and engagement member 37 speeds. When required, such as when jamming occurs, the fixed speed relationship of the conveyor and the engagement unit 37 may be advantageously altered locally by an operator at the travelling controller. Alternatively, the control system is capable of providing control over the entire system such that the conveyor and engagement unit are controlled to operate predeterminately synchronously, alternately, and intermittently during standard loading and unloading procedures and is capable of operating predeterminately asynchronously, alternately, and intermittently during aberrant loading and unloading procedures. Thus the control system can be disabled and allow manual control over each individual function, or predetermined control over related groups of functions, thus simplifying control of the system during manual control of an aberrant procedure. In FIGS. 7a and 7b there is shown, in plan view, a load handling system employing two load engagement units 37c–37f. As shown in FIG. 7a, two suction cups 35d and 35e engage an end 34g of container 31g located on a shelf 32g constituting one storage base, and two suction cups 35f and 35g of the other unit engage with an end 34h of another container 31h located on a shelf 32h constituting another storage base.

Two suction cups 35h and 35i of the system shown in FIG. 7b engage an end 34i of container 31i on a shelf 32i. In FIG. 7b, suction cups 35j and 35k engage an end 34i of the same container 31i.

Thus, as depicted in FIG. 7a, each unit moves a separate container, while in FIG. 7b, both units engage and move the same container 31i. In this way, loads of various sizes may be moved by the same equipment by varying the number of engagement members used for transport.

Control of the present load handling system is accomplished with the aid of a programmable logic unit or microprocessor. The controller is used for example, to create vacuum in the suction cups or to release the vacuum present in the suction cups at the desired moment, coordinate the relative velocities of the conveyor 33 and the engagement unit 37, interpret data from the position detector 28 as to when to reposition the engagement unit 37, and at what height, etc. Various other systems are and can be controlled, such being within the scope of those skilled in the appropriate art.

It will be apparent to persons skilled in the art that different embodiments of the invention are not exclusively confined to the examples presented in the foregoing. Rather they may vary within the scope of the claims following below. For instance, in the handling of machine pallets used for machine tool units, electromagnets may be used instead of suction cups, in which case the engagement surfaces on the sides or ends of the load must be of magnetic. The load is pulled from the storage base onto the transport base by electromagnets by displacing the electromagnets into contact with the magnetic engagement surfaces, energizing the electromagnets, to engage the engagement surfaces, pulling the load by means of the electromagnets from the storage base onto the transport base, de-energizing the electromagnets, and disengaging the electromagnets from the engagement surfaces. The load is pushed from the transport base onto the storage base in similar reverse fashion.

We claim:

1. A system for handling a plurality of loads in a warehouse shelving arrangement having a plurality of shelves for storing respective loads, said system comprising:
   (a) a travelling base laterally displaceable with respect to said shelving arrangement;
   (b) elevating means disposed on said travelling base;
   (c) a transport base operably mounted on said elevating means, said transport base being laterally and vertically displaceable by means of said travelling base and said elevating means, respectively, between operative positions opposite respective storage shelves, said transport base including:
   (c1) a conveyor drivably mounted on said transport base for movably supporting a load;

(c2) an engagement unit operatively disposed above said conveyor for movably engaging the load;

(c3) an engagement member movably mounted on said engagement unit for linear movement in a direction toward and away from the storage shelf;

(c4) at least one engagement means disposed on said engagement member, said engagement means being operatively engageable with a surface of the load for moving the load between said transport base and a respective shelf; and (c5) position detecting means disposed on said transport base for detecting a position of the load on said conveyor with respect to said transport base, said engagement unit and said storage shelf, said position detecting means being vertically displaceable with respect to said conveyor means for detecting a height of the load on said conveyor.

2. A system as claimed in claim 1 wherein said position detecting means comprises an optical detection system selected from a group consisting of beam-make systems, beam-break systems and combinations thereof and frequency filtering.

3. The system of claim 1 wherein said travelling base and said transport base further comprise respective location detecting means for detecting a relative horizontal and vertical position of said travelling base and said transport base respectively with respect to said warehouse shelving arrangement.

4. The system of claim 3 wherein said location detecting means comprises:

a gear rack for engaging a gear;

a pulse sensing system comprising a gear for engaging said gear rack and at least one sensor operatively interacting with said gear to detect rotation of said gear;

wherein said at least one sensor is selected from a group consisting of mechanical, electrical, magnetic, and optical sensors.

5. The system of claim 1 wherein said engagement unit includes slide rail means comprising at least two slide rails in a spaced apart parallel relationship, said slide rail means movably supporting said engagement member.

6. The system of claim 1 wherein said at least one engagement means comprises suction cups engageable with said engagement surface of a load by means of a vacuum.

7. The system of claim 1 wherein said at least one engagement means comprises magnetic means engageable with said engagement surface by means of magnetic attraction.

8. The system of claim 1 wherein said transport base is positioned higher than said storage shelf for movement of the load from said transport base onto said storage shelf so that respective top surfaces of said conveyor and storage shelf are not substantially aligned.

9. The system of claim 1 wherein said conveyor and said engagement unit are adapted to operate predeterminately synchronously, alternately, and intermittently during normal loading and unloading procedures and capable of operating predeterminately asynchronously, alternately, and intermittently during aberrant loading and unloading procedures.

10. A system as claimed in claim 1, wherein said shelves have different respective heights for accommodating loads having respective different heights.

* * * * *